(12) United States Patent
Lu et al.

(10) Patent No.: US 10,334,646 B2
(45) Date of Patent: Jun. 25, 2019

(54) D2D RESOURCE UTILIZATION MONITORING IN A WIRELESS COMMUNICATION NETWORK

(71) Applicant: Telefonaktiebolaget LM Ericsson (publ), Stockholm (SE)

(72) Inventors: Qianxi Lu, Beijing (CN); Iana Siomina, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 44 days.

(21) Appl. No.: 15/327,882

(22) PCT Filed: Aug. 6, 2015

(86) PCT No.: PCT/SE2015/050853
§ 371 (c)(1),
(2) Date: Jan. 20, 2017

(87) PCT Pub. No.: WO2016/022063
PCT Pub. Date: Feb. 11, 2016

(65) Prior Publication Data
US 2017/0208490 A1    Jul. 20, 2017

(30) Foreign Application Priority Data

Aug. 7, 2014 (WO) ................ PCT/CN2014/083903

(51) Int. Cl.
*H04W 76/14* (2018.01)
*H04L 5/00* (2006.01)
(Continued)

(52) U.S. Cl.
CPC .......... *H04W 76/14* (2018.02); *H04L 5/0055* (2013.01); *H04W 24/08* (2013.01); *H04W 72/044* (2013.01); *H04W 92/18* (2013.01)

(58) Field of Classification Search
CPC ... H04W 24/08; H04W 72/044; H04W 92/18; H04W 76/14; H04L 5/0055
(Continued)

(56) References Cited

U.S. PATENT DOCUMENTS

2013/0012221 A1   1/2013   Zou et al.
2013/0225184 A1   8/2013   Liu et al.
(Continued)

FOREIGN PATENT DOCUMENTS

WO       2014098689 A1    6/2014

OTHER PUBLICATIONS

LG Electronics, "R1-141352: Operation in Mode 1 resource allocation for D2D communication," 3rd Generation Partnership Project (3GPP), TSG RAN WG1 Meeting #76bis, Mar. 31-Apr. 4, 2014, 3 pages, Shenzhen, China.
(Continued)

*Primary Examiner* — Obaidul Huq
(74) *Attorney, Agent, or Firm* — Patent Portfolio Builders, PLLC

(57) ABSTRACT

There are described methods and apparatuses for monitoring D2D communication, in particular in a wireless communication network. One method comprises receiving of allocation data indicating allocated resources for a first D2D enabled node for D2D communication with a second D2D enabled node of the wireless communication network; and transmitting D2D data utilizing and/or on the indicated allocated resources; and receiving of the D2D data transmitted by the first D2D enabled node.

7 Claims, 6 Drawing Sheets

(51) Int. Cl.
*H04W 24/08* (2009.01)
*H04W 72/04* (2009.01)
*H04W 92/18* (2009.01)

(58) Field of Classification Search
USPC .................................................. 370/241, 252
See application file for complete search history.

(56) References Cited

U.S. PATENT DOCUMENTS

2014/0094183 A1* 4/2014 Gao .................... H04W 72/048
455/450
2015/0078279 A1* 3/2015 Ko ........................ H04W 76/14
370/329
2016/0242152 A1* 8/2016 Yu .......................... H04W 76/14
2016/0249341 A1* 8/2016 Jung ..................... H04W 76/14

OTHER PUBLICATIONS

Nokia et al., "R1-134535: D2D Communication without network coverage," 3rd Generation Partnership Project (3GPP), TSG-RAN WG1 Meeting #74bis, Oct. 7-11, 2013, 5 pages, Guangzhou, China.
ZTE, "R1-133148: Study on D2D Communication," 3rd Generation Partnership Project (3GPP), TSG-RAN WG1 Meeting #74, Aug. 19-23, 2013, 9 pages, Barcelona, Spain.
International Search Report and Written Opinion for International Patent Application No. PCT/SE2015/050853, dated Jan. 28, 2016, 16 pages.

\* cited by examiner

D2D RESOURCE UTILIZATION MONITORING IN A WIRELESS COMMUNICATION NETWORK

This application is a 35 U.S.C. § 371 national phase filing of International Application No. PCT/SE2015/050853, filed Aug. 6, 2015, which claims priority to International Application No. PCT/CN2014/083903, filed Aug. 7, 2014, the disclosures of which are incorporated herein by reference in their entireties.

TECHNICAL FIELD

The present disclosure pertains to monitoring of D2D resource utilization in a wireless communication network.

BACKGROUND

Recent developments of the 3GPP Long Term Evolution (LTE) facilitate accessing local IP based services in the home, office, public hot spot or even outdoor environments. One of the important use cases for the local IP access and local connectivity involves the direct communication between devices (e.g. D2D enabled devices, for example UEs or terminals) in close proximity (typically less than a few 10s of meters, but sometimes up to a few hundred meters) of each other.

This direct mode or device-to-device (i.e. D2D) communication enables a number of potential gains over the traditional cellular technique, because in D2D communication devices are typically much closer to one another than cellular devices that have to communicate via a cellular access point (AP, e.g., an eNB), such as:

Capacity gain: First, radio resources (e.g. OFDM resource blocks) between the D2D and cellular layers may be reused (reuse gain). Second, a D2D link uses a single hop between the transmitter and receiver points respectively the terminals or devices involved in direct communication, as opposed to the 2-hop link (or more) via a cellular AP (hop gain).

Peak rate gain: due to the proximity and potentially favorable propagation conditions high peak rates could be achieved (proximity gain).

Latency gain: When the devices (like UEs) communicate over a direct link, eNB forwarding may be unnecessary and the end-to-end latency can decrease.

SUMMARY

Generally, D2D communication takes place between D2D enabled nodes, bypassing network nodes like eNodeBs, even if in some forms of D2D communication, administrative or managing tasks like granting resources for D2D communication may be performed on network side, e.g. by a network node like an eNodeB. Thus, the network (usually an eNodeB) might have difficulties to determine usage of resources granted for D2D communication, making managing the network more difficult. It is an object of the present disclosure to describe approaches allowing monitoring of resources used for D2D operation or communication, which in turn may provide a basis for improved network and/or resource management.

There is disclosed a method for monitoring D2D communication. The method comprises receiving, by a first D2D enabled node, of allocation data indicating allocated resources for the first D2D enabled node. The method further comprises transmitting, by the first D2D enabled node, D2D data utilizing and/or on the indicated allocated resources, as well as receiving, by a receiving node of the wireless communication network, of the D2D data transmitted by the first D2D enabled node.

Moreover, there is disclosed a method for operating a first D2D enabled node in a wireless communication network. This method comprises receiving, by the first D2D enabled node, of allocation data indicating allocated resources for the first D2D enabled node for D2D communication with a second D2D enabled node of the wireless communication network. This method also comprises transmitting, by the first D2D enabled node, D2D data on and/or utilizing the allocated resources.

In addition, there is disclosed a method for operating a node in a wireless communication network. The method comprises receiving, by the node, of D2D data on and/or utilizing allocated resources, the allocated resources being allocated to and/or for a first D2D enabled node of the wireless communication network.

A first D2D enabled node for a wireless communication network is also suggested. The first D2D enabled node is adapted to receive allocation data. The first D2D enabled node further is adapted to transmit D2D data comprising an acknowledgment or non-acknowledgement signal or message or A/N feedback.

Furthermore, there is disclosed a receiving node for a wireless communication network. The receiving node is adapted to determine usage of allocated resources by a first D2D enabled node based on received D2D data.

A wireless communication network comprising at least a receiving node as described herein and a first D2D enabled node as described herein is also disclosed.

In addition, there is suggested a computer program product comprising instructions executable by control circuitry, the instructions causing the control circuitry to carry out and/or control any of the methods described herein when executed by the control circuitry.

A storage medium adapted to store instructions executable by control circuitry is proposed, the instructions causing the control circuitry to carry out and/or control any of the methods described herein when executed by the control circuitry.

BRIEF DESCRIPTION OF THE DRAWINGS

The attached figures of the drawings are intended to illustrate the concepts and approaches described herein, without limiting them. More specifically, the figures show.

DETAILED DESCRIPTION

Figure 1:
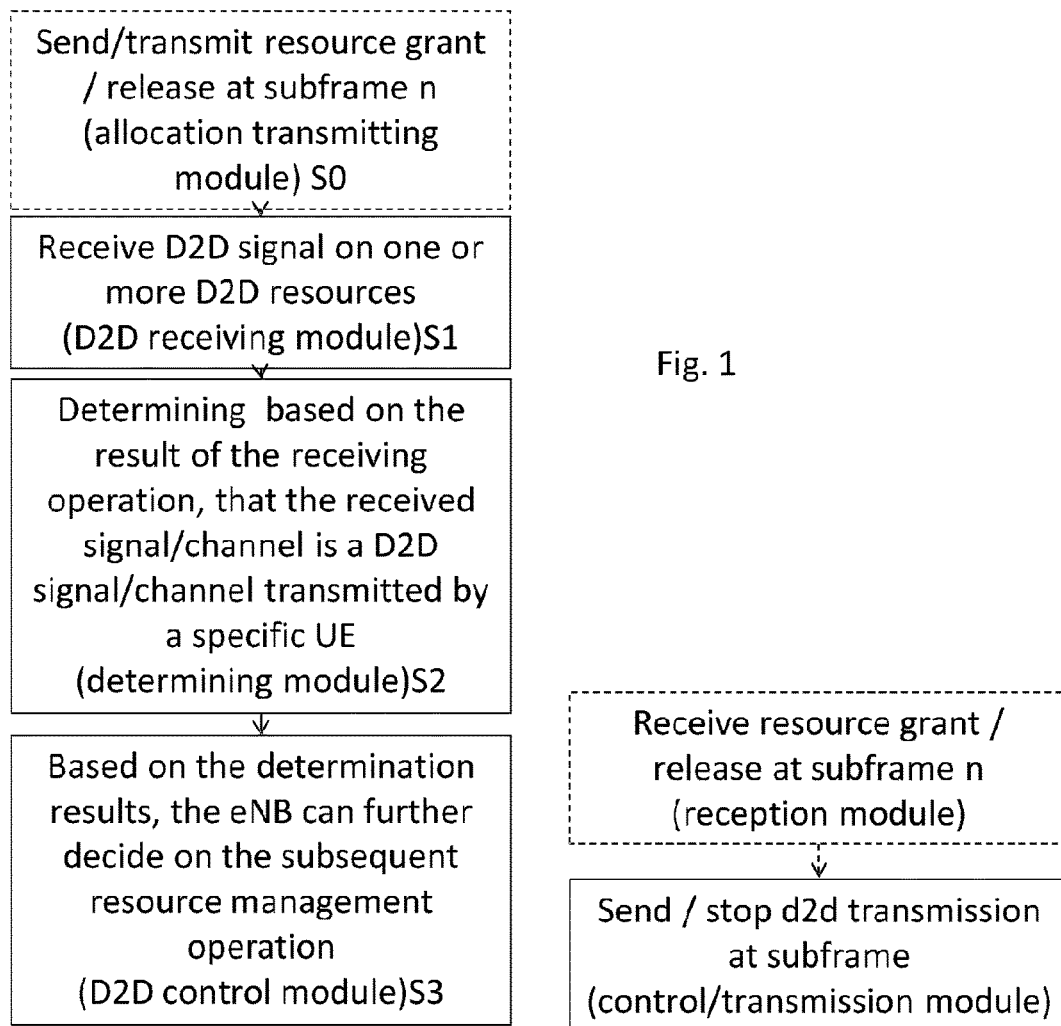
FIG. 1 a flowchart of an exemplary method according to one of the approaches disclosed herein.

There may be provided, e.g. in the context of a telecommunications standard like LTE, a D2D-specific resource grant to allocate resources for SA and D2D data transmissions for each D2d enabled device like a UE:

For a mode, e.g. Mode 1, a DCI format variant having the same or an analogous size as the existing DCI format 0, may be used for allocating D2D Data and SA Same grant for D2D Data and SA For Mode 1, a D2D RNTI is used to distinguish a grant for WAN or another, parallel network, from grant from D2D.

In case of D2D resource grants, it may be unclear how to ensure that the node allocating resources, e.g. a base station or an eNB, is capable of determining the D2D resource utilization status for the resources allocated, as the actual communication using or not using the resources does not involve the node or base station.

Some approaches for determining resource utilization for D2D by a node, e.g. a base station, may be as follows:

One approach, approach 1, may comprise a method for and/or carried out by a radio network node or node of or for a wireless communication node (e.g. base station or eNB), which may be considered as a receiving node, which in one variant may be implemented as an allocation node.

The method may comprise receiving, by the node, a D2D transmission and/or D2D data from a first D2D enabled node like a UE, and/or listening to, in particular directly listening to, and/or sensing D2D transmission and/or D2D data from the first D2D enabled node or UE.

A UE may be generally considered as an example of a D2D enabled node or a first D2D enabled node in this context and in the following may represent such node.

The receiving node may be adapted to access and/or read and/or store allocation data indicating resources allocated to the first D2D enabled node for transmission of D2D data. Receiving may in particular be performed on a resource or resources granted or allocated, in particular to the D2D enabled node, for example by the node or an allocating node or a base station like an eNB to the UE.

For example, the receiving node may be informed about the resources allocated or granted by the allocation node and/or be adapted to receive corresponding allocation data, e.g. by a corresponding message sent by the allocation node, or the receiving node itself may be the allocation node and for example store allocating data indicating the resources allocated and/or granted in a memory of the receiving node.

Receiving the D2D data may comprise monitoring corresponding signals and/or transmissions from the first D2D enabled node.

The method may additionally comprise determining usage of the resources, in particular the resources allocated to the first D2D enabled node, e.g. by the receiving node or a determining node receiving data corresponding to the D2D data and/or data received by the receiving node. Such data may generally be basis for a determination as described in the following. The receiving node may generally determine, based on the result of the receiving and/or the received D2D data and/or allocation data indicating the allocated resources, at least one signal/channel which is expected to be transmitted by the first D2D enabled node or UE upon successful receiving of the grant or allocation data, that the received signal/channel is the expected D2D signal/channel transmitted by the UE or not and/or determine whether the granted D2D resource as indicated by the allocation data is used by the UE or not. The receiving node may monitor the D2D transmission of the first D2D node to determine whether the allocated resources are used. A similar principle may be applied to verify whether a resource release message is received by the UE, but in this case the receiving node or a node receiving data from it would need to determine that the resources are not used or no longer used, based on receiving a signal/channel or lack of a transmission which otherwise would be transmitted by the UE in the allocated resource. In one embodiment, to facilitate sensing at eNB, the power control for D2D transmissions may be adapted accordingly (e.g., the transmit power of D2D transmissions should not be weaker by more than a threshold compared to a cellular transmission by the same UE).

Approach 1 may be applied to resource grant and/or resource release, which may be considered to be represented in or by corresponding allocation data.

A corresponding method in the first D2D node or UE may also be implemented: the D2D node or UE may be required and/or instructed and/or be adapted, in response to allocation data received, to transmit at least a predetermined number N (N=1, 2, . . . ) of D2D transmissions in the allocated resources upon successful reception of the grant or allocation data.

The number N of transmissions and/or the D2D resources for these transmissions (e.g., a subset of the resources allocated or in the grant) may be pre-defined or configurable and/or be indicate in the allocation data. In another variant, upon receiving a resource release (grant) or corresponding allocation data, the D2D enabled node or UE may be required to stop transmitting either immediately or within a certain (e.g., pre-defined or configurable) time at least on certain (e.g., pre-defined or configurable, e.g. by the allocation data) time-frequency resources, which may be indicated in the allocation data.

Approach 2: A method of and/or for and/or in a receiving node (e.g., eNB) to receive a D2D-specific A/N feedback from a first D2D enabled node or UE, as response to the resource grant/release or allocation data sent or transmitted from an allocation node or the receiving node to the D2D node UE.

A method in the first D2D enabled node or UE may also be implemented: to acknowledge the D2D resource grant or reception of the allocation data using an independent (i.e., D2D-specific) A/N feedback on PUCCH, so that by receiving the A/N or not, the receiving node or a eNB may know whether the D2D grant or allocation data is missed by the D2D enabled node or UE or not and/or whether it was successfully received/decoded if not missed. The A/N feedback may be considered to be D2D data. In a further embodiment, the first D2D enabled node may be adapted to schedule and/or transmit no D2D transmission and/or D2D data to and/or for a second D2D enabled node in the subframe in which the A/N feedback is to be transmitted by the first D2D enabled node or UE to the receiving node (in this context, adaptation of resource allocation in the grant or allocation data and/or A/N scheduling may be performed in the receiving or an allocation node and/or first D2D enabled node); if the first D2D enabled node or UE is capable of simultaneous transmission of the A/N feedback and the D2D transmission, it may be adapted for simultaneous or near-simultaneous transmission (e.g. within the same subframe) of feedback to or for the receiving node and D2D data for and/or to the second D2D enabled node. Alternatively, sending the D2D A/N feedback may be prioritized by the UE over the D2D transmission in the same subframe, i.e., the former is transmitted and the latter is delayed or dropped.

The methods of approaches 1 & 2 may be combined, e.g.:

The receiving node may be adapted to, if it does not receive the explicit feedback (Approach 2) at a certain expected (e.g., pre-defined or configurable) time and/or time-frequency resource or after a certain time (e.g., pre-defined or configurable) elapsed from transmitting or sending the grant/release message or allocation data, determine the D2D resource utilization status or usage by itself (e.g., using Approach 1), e.g. by receiving and/or listening to D2D data transmission of the first D2D enabled node to and/or for a second D2D enabled node.

Based on Approach 1, 2, or their combination, subsequent operation may be done by the receiving node or an allocation node receiving data based on the received D2D data based on the detected or determined D2D resource utilization status or usage by the first D2D enabled mode.

It may be envisioned that, the receiving node or radio network node (e.g., eNB) is adapted to transmit corresponding allocation data anew or a second time, e.g. a second grant or release (which may be a retransmission of the first one or may be different, at least in part, from the first transmission or grant or release), if it determines and/or finds out that the grant/resource release or allocation data has not been successfully received and/or based on a corresponding determination.

Alternatively or additionally, the receiving node or eNB may be adapted to release the allocated resources implicitly or explicitly, e.g. by transmitting corresponding allocation data to and/or for the first D2D enabled node or UE, e.g. comprising a release message, if the receiving node or eNB determines or finds out that the resource is not needed or not used by the D2D and/or based on a corresponding determination.

Alternatively or additionally, the receiving node or radio network node may be adapted to maintain and update accordingly the D2D resource utilization status (e.g., in a storage like a buffer, in internal/external memory or a database), based on the determination of the status either based on the UE feedback or on determining by sensing and/or monitoring and/or listening to D2D data transmitted to and/or for a second D2D enabled mode.

The D2D resource utilization status may be used by the receiving node and/or an allocation node, which may be the receiving node, for any one or more of several purposes, e.g., to trigger another grant or release message or corresponding transmission of allocation data, transmitting the status to another node (e.g., neighbor eNB at UE handover and/or for resource coordination or interference coordination purpose and/or allocation node), (re)allocate D2D resources for the same D2D enabled node or UE and/or other D2D enabled nodes or UEs, (re)allocate resources for cellular UL transmissions by the same D2D enabled node or UE and/or other nodes or UEs, collect resource utilization statistics over multiple D2D enabled nodes or UEs and/or possibly share the statistics with another node, for power control of D2D transmissions and/or cellular UL and/or DL transmissions. Allocations as mentioned above may be performed by an allocation node based on data received from the receiving node, which may be based on and/or represent D2D data received by the receiving node.

In these ways, a node of the network like an eNB can be aware of the D2D resource utilization status for appropriate scheduling operation. In particular, the node or eNB may be aware of a 'grant missing' for D2D resource grant or a corresponding missed release.

The approaches may be summarized as:

Approach 1: Implicit feedback solution using the D2D transmission, in particular without specific A/N feedback FIG. 1 shows a flow chart for approach 1 (left: network or receiving node, right: D2D enabled node or UE)

Step S0, which may be performed by an allocation transmission module: The first network node or an allocation node, which may be a receiving node, sends the resource grant/release as allocation data to the first UE, which is at subframe n. In this case, the receiving node may be an eNB.

In one embodiment, to facilitate receiving and/or sensing of the D2D data at the receiving node or eNB, the power control for D2D transmissions may be adapted accordingly (e.g., the transmit power of D2D transmissions should not be weaker by more than a threshold compared to a cellular transmission by the same D2D enabled node or UE).

A D2D power control command and/or transmit power configuration may be comprised in the D2D resource grant or allocation node sent or transmitted to the D2D enabled node or UE. In another embodiment, all or some D2D transmit power parameters may be broadcasted.

Step S1, which may be performed by a D2D receiving module: In this step, on the one hand, the UE may be required to transmit data (different embodiment as follows), and the receiving node or network node would monitor the resource, e.g. as indicated in the allocation data, to detect the D2D resource status; the D2D receiving module may be implemented on the receiving node.

Some embodiments at D2D enabled node/UE side in Step S1 may be: In one embodiment, a method in the UE may also be implemented: the UE may be adapted to and/or be required to transmit at least N (N=1, 2, . . . ) D2D transmissions in the allocated resources upon successful reception of the grant and/or allocation data, e.g. as indicated by and/or based on this data. The number N of transmissions and/or the D2D resources for these transmissions (e.g., a subset of the resources in the grant) may be pre-defined or configurable.

It may be envisioned that the UE or D2D enabled node is adapted to and/or required to stop transmitting either immediately or within a certain (e.g., pre-defined or configurable) time at least on a certain (e.g., pre-defined or configurable) time-frequency resources upon and/or in response to and/or based on receiving a resource release and/or corresponding allocation data. The configurable parameters may be configured e.g., by PHY or higher layer signaling (e.g., RRC).

Optionally, the receiving node or eNB in Step S1 may be adapted according to: Step S1.1: The eNB (the receiving node) may receive at least one signal/channel on time-frequency resources and/or allocated resources for D2D transmissions, differentiating from cellular UL transmissions. Some sub-embodiment of this step can be as follows:

1) The time-frequency resources on which the D2D signal/channel is expected (by the receiving node) to be received could be either configured by the receiving node, or a second network node other than the receiving node (e.g., an allocation node and/or another eNB; also, with carrier aggregation, the UE may have multiple serving cells where may exist this cross-carrier scheduling case). Furthermore, an allocation node is not necessarily a base station or eNB (e.g., the resource configuration may potentially be done by a central node which is not eNodeB, i.e., it may not be able to 'serve' the UE).

2) Alternatively or additionally, the time-frequency resources, on which the D2D signal/channel is received, could be either the resources configured by network or allocation node or selected by the UE itself. E.g., the D2D enable node or UE may have freedom to select the specific resources to use within the 'pool' of resources which is configured by the network, and/or may be adapted to utilize resources from the allocated resources indicated in the allocation data.

3) Alternatively or additionally, the D2D enabled node or UE, which is sending or transmitting the D2D signal/ channel or D2D data could be either served by the allocation node and/or the receiving node, and/or served by a different network node or base station or eNB. E.g., if the resources are used by both a first cell (served by a first network node like allocation node and/or receiving node) and a second cell (served by the different network node).

Step S2, which may be performed by determining module, which e.g. may be implemented on the receiving node or a allocation node receiving data pertaining to the D2D data received from the receiving node: The receiving node and/or allocation node determines, based on the result of the receiving the D2D data on at least one signal/channel, that and/or whether the received D2D data or signal/channel is a D2D signal/channel transmitted by a D2D enabled node like a UE, in particular by the first D2D enabled node. In some examples, the determining can be based on calculating correlation of a received signal and a known D2D signal sequence. After this step, the receiving node or allocation node (first network node) may be adapted to know whether the signal/channel comes from the specific (known to the first network node) D2D enabled node or UE, or, in another embodiment, the first network node may determine from which D2D enabled node or UE the D2D signal/channel comes from. To implement this, some enablers could be:

1) The D2D signal/channel is generated based on an identity associated with D2D enabled node or UE transmitting out the signal/D2D data.

2) Alternatively or additionally, the first network node may have info on the D2D enabled nodes or UE's identity, e.g. the ID info of one or more nodes or UEs interested in receiving and/or requesting grants/allocated resources from the first network node.

Step S3, which may be performed by a D2D control module, which may be implemented on the receiving node or allocation node: Based on the determining results, the first network node can further decide on the subsequent resource management operation. Some sub-embodiment of this step can be as follows:

1) Steps S1 and S2 may be performed to verify the reception by the first D2D enabled node or UE of a first D2D resource grant/release or allocation data (e.g., the D2D resource grant/release sent at subframe n) by the first network node (in particular, the allocation node) to the first D2D enabled node or UE. For example, if the Step S1 and S2 (e.g., at resources in subframe n+m) show the first D2D enabled node or UE is not utilizing the resources (could be the case that there is no D2D transmission on that resources, or the case that there is a second UE doing D2D transmission on that resources), so that the first network node (receiving node or allocation node) may assume that the grant or allocation data is missed by the first D2D enabled node or UE, and a second resource grant would be sent to the first D2D enabled node or UE by the first network node afterwards.

2) Alternatively or additionally, step S1 and S2 may be performed to verify whether the resources are needed by the first D2D enabled node or UE or not (this is the case where a single grant or allocation data allocates a series of resources, where the D2D enabled node or UE can decide whether to continue to use it or not). For example, if the step 1 and 2 show that the first D2D enabled node or UE is not utilizing the resources (e.g., if there is no D2D transmission on that resources, or the case that there is a second D2D enabled node or UE doing D2D transmission on that resources), so that the first network node would know the resource is not needed, so that the resources can be dropped/collected and/or released. The first network node may send a release message or corresponding allocation data in this case.

3) In another alternate or additional embodiment, the first network node or receiving node or allocation node may maintain and update accordingly the D2D resource utilization status (e.g., in a buffer, in internal/external memory or a database), based on the determining the status, in particular based on the feedback by the D2D enabled node or UE and/or on determining by sensing D2D data transmitted to and/or for a second D2D enabled node. The D2D resource utilization status may be used by the network node for several purposes, e.g., trigger another grant or release message or allocation data, transmitting the status to another node (e.g., neighbor eNB at UE handover or for resource coordination or interference coordination purpose), (re)allocate D2D resources for the same UE and/or other UEs, (re)allocate resources for cellular UL transmissions by the same UE and/or other UEs, collect resource utilization statistics over multiple UEs and possibly share the statistics with another node, for power control of D2D transmissions and/or cellular UL and/or DL transmissions;

4) Alternatively or additionally, steps S1 and S2 may be performed to control the interference environment in the allocated D2D resources and optimize resource allocation for D2D and/or cellular communication. If the interference (e.g., from one or more second D2D enabled nodes or UEs) is too high, then the first network node can re-schedule the resources, in order to perform interference coordination between D2D and cellular transmissions or between different D2D transmissions in a better way.

Approach 2: Explicit D2D-specific feedback by the UE by sending A/N signaling.

Figure 2:
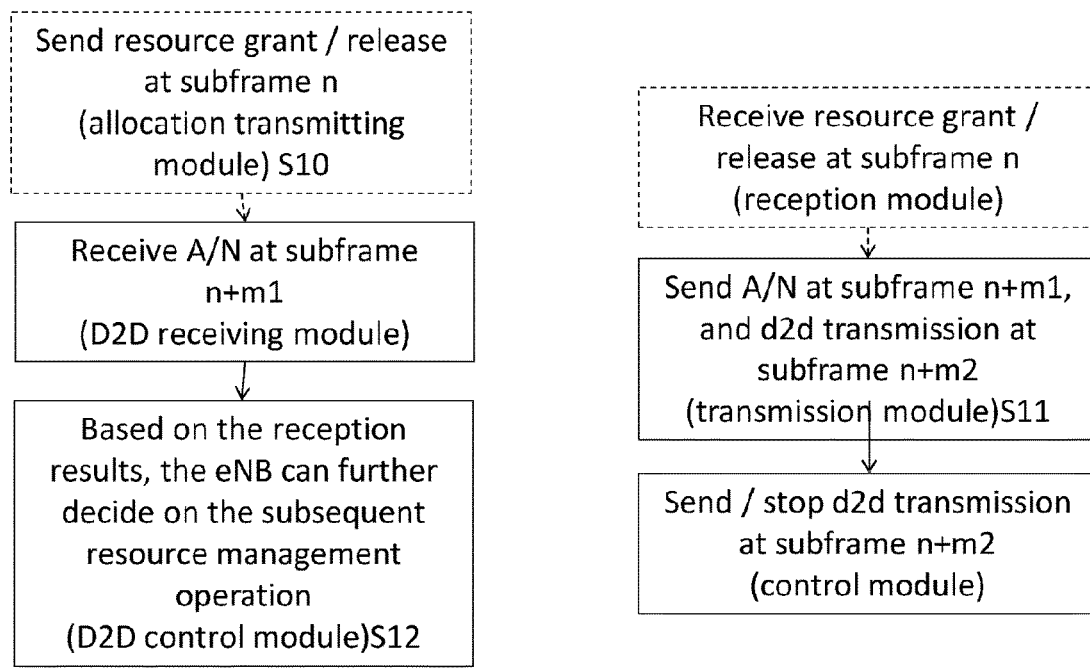
FIG. 2 a flowchart of an exemplary method according to another of the approaches disclosed herein.

FIG. 2 shows a flow chart for approach 2 (the left-hand side pertains to a receiving/network node, the right-hand side to a D2D enabled node/UE)

Step S10, which may be performed by an allocation transmission module: The first network node or allocation node sends the resource grant (as an example for allocation data) to the first D2D enabled node, represented as an example by an UE, which is at subframe n.

Some embodiments on the network side in Step S10 may be as follows:

In one embodiment, the power control for the D2D-specific feedback may be adapted accordingly to ensure that the receiving node can receive the feedback.

The transmit power configuration for the D2D specific feedback may be the same or similar as for cellular UL. A power control command and/or transmit power configuration for the D2D-specific feedback may be comprised in the D2D resource grant or allocation data sent to the UE by the allocation node. In another embodiment, some or all transmit power parameters for the D2D specific feedback may be broadcasted by the network.

Step S11, which may be performed by a transmission module: In this step, a D2D-specific A/N feedback can be used or transmitted by the UE, e.g., as follows:

1) To acknowledge the resource grant/release reception (e.g. by a reception module), the UE can do the following: If receiving the resource grant/release or allocation data correctly, the UE could be adapted to 1) transmit or send an A/N feedback on PUCCH to the first network node or allocation node or receiving node to acknowledge the D2D resource grant or allocation data (the PUCCH transmission can be different than it would be for cellular UL grant); and/or 2) transmit or send D2D data for and/or to a second D2D enabled node (for (implicitly) acknowledging the grant) or stop (for (implicitly) acknowledging the release) D2D transmission on the allocated resources.

2) Alternatively or additionally, an explicit resource release signaling to the receiving node or allocation node or eNB may be considered: this may be the case where a single grant allocates a series of resources, where the first D2D enabled node or UE can decide whether to continue to use it or not. If the UE decides to release the resources actively, the A/N feedback can be sent to receiving node or eNB as an indication of 'resource release' (i.e., the A/N feedback may comprise a resource release indication in this example, which may indicate to the network that either the UE has released/not going to use the granted resources or the UE indicates to the network that the granted resource may be released).

3) In the above, the grant and the A/N feedback may be related to a single D2D transmission or to multiple D2D transmissions and/or retransmissions.

In one further embodiment, the transmission of the D2D-specific feedback can be scheduled in different ways, e.g.: pre-defined (e.g., a certain subframe after receiving the grant) or configurable (e.g., by the network in the same D2D-specific grant or by other network signaling means). In a further embodiment, the UE may further adapt the scheduling of the D2D-specific feedback.

In another further embodiment, one D2D-specific feedback message may multiplex one D2D-specific feedback with either cellular feedback or another D2D-specific feedback (e.g., to another grant).

There are different ways for the A/N feedback transmissions to co-exist with D2D and/or cellular transmission. For example, the D2D enabled node or UE may be adapted to transmit and/or send both D2D data transmission to and/or for another UE and the A/N to the network which may happen to collide in the same subframe upon receiving the grant or allocation data. It may be assumed that these two operations are to be done in subframe n+m1 and n+m2, respectively.

A. If the UE is capable of simultaneous transmission of the D2D feedback and the D2D and/or cellular transmission, the case when m1=m2 may be supported by the UE, i.e., the two transmissions can happen in the same subframe.

B. Else, a) it may be ensured that m1 cannot be equal to m2, which is ensured by the network and/or UE since the two transmissions cannot/are not allowed to collide with each other; the value of each of m1 and m2 can be pre-configured by RRC signaling or pre-defined by specification or decided by the UE; this can be implemented, e.g., by adaptation (by network and/or UE) of resource allocation in the D2D/cellular grant, respectively, and/or D2D feedback scheduling; or:

b) if it happens that m1=m2 (e.g., due to no adaptation in the network) or there is also another D2D transmission in subframe m1 not scheduled by this grant but some other grant, the D2D enabled node or UE would prioritize one transmission over the other, i.e., the former is transmitted and the latter is delayed or dropped; which transmission (D2D transmission/cellular transmission or D2D feedback) is prioritized can be pre-defined or configurable in the D2D enabled node or UE by the network.

c) The D2D-specific A/N feedback can happen over different channels (e.g., PUCCH or PUCCH), in different format (as a PHY signal, or MAC CE, or a RRC signaling), i.e., the disclosure is not limited to a particular implementation.

Step S12, which may be performed by a D2D control module, which may be implemented on the receiving node and/or allocation node: Then, based on the reception results, the receiving node or allocation node (first network node) or eNB can further decide on the subsequent resource management operation, which is similar to the step 3 of approach 1

It is also possible to combine Approach 1 and Approach 2. One example of such combining comprises: If the receiving node or eNB does not receive any feedback from the D2D enabled node or UE in subframe n+m1, it may still use Approach 1 to determine in subframe m2 (m2>m1) whether the granted D2D resources are still used by the D2D enabled node or UE. In another example, even if the network node has received the D2D-specific feedback from a D2D enabled node or UE, it may still verify whether the D2D enabled node or UE is utilizing the granted resources according to the D2D-specific feedback it sent to the network.

Independent Network Node (Approach 1)

There is described a Method, e.g. in or including a first network node (e.g., eNB or receiving node) comprising the steps of:

1) Step 1: selectively receiving at least one signal/channel on time-frequency resources for D2D transmissions (which may be different/differentiated from cellular UL transmissions, and/or which may be considered to represent D2D data), 2) Step 2: determining, based on the result of the receiving the at least one signal/channel and/or D2D data, that the received signal/channel or data is a D2D signal/channel transmitted by a first UE or D2D enabled node.

The D2D signal/channel or D2D data may be received on time-frequency resources configured by the first network node and/or transmitted to the D2D enabled node as allocation data.

The D2D signal/channel or D2D data may be received on time-frequency resources configured by a second network node, e.g. an allocation node.

The D2D signal/channel or D2D data may be received on time-frequency resources selected by the first UE, in particular based on and/or chosen from resources allocated indicated by the allocation data.

The first D2D enabled node or UE may be served by the first network node. Alternatively or additionally, the first UE may be served by a network node other than the first network node.

Steps 1 & 2 may be performed to verify the reception by the first UE of a first D2D resource grant or a first D2D resource release message sent by the first network node to the first D2D enabled node or UE.

The determining may be based on calculating correlation of a received signal and a known D2D signal sequence.

There may be optionally performed a step of sending or transmitting a second D2D resource grant or allocation data to the first D2D enabled node or UE in response to determining that the time-frequency resources for D2D transmissions are not received and/or are missed by the first D2D enabled node or UE for transmitting the D2D signal/channel/data.

The D2D signal/channel/data may be generated or determined based on an identity associated with the first D2D enabled node or UE.

The identity may be known to the network node prior Step 2, e.g. from information provided by the first D2D enabled node or UE.

The identity may be determined by the network node in Step 2 from a set of candidate identities, which may include a list of D2D enabled nodes or UEs having requested D2D resources and/or other resources and/or have and/or are registered with the network and/or allocation node and/or receiving node and/or first network node.

Generally, time-frequency resources for D2D transmissions or D2D data in which the at least one signal/channel is received may be scheduled N subframes after the first grant or allocation data or release was transmitted (N may be pre-defined or configurable)

The determination may be performed for a LI (Lawful Intercept) purpose.

Additionally or alternatively, the first network node or receiving node or allocation node may determine and/or maintain the D2D resource utilization for a specific D2D resource and/or for a specific DVD enabled node or UE, in particular the first of such.

It may be considered that the first network node or allocation node or receiving node performs resource coordination and/or interference coordination between D2D and cellular transmissions or between different D2D transmissions with one or multiple cells, based on the determination result.

The first network node or allocation node may adapt the transmit power of the D2D transmission of the first D2D enabled node or UE to ensure receiving the D2D transmission at the network node.

The method may comprise a step of performing by the first network node or allocation node one or more subsequent resource management operation.

Independent Network Node (Approach 2)

A Method, e.g. in or including a first network node (e.g., eNB or allocation node) comprising the steps of:

1) Step 1: transmitting or sending a D2D resource grant or D2D resource release message (or, more general, allocation data) to a first D2D enabled node or UE, 2) Step 2: receiving, e.g. by a receiving node, a D2D-specific feedback (or D2D data) from the first D2D enabled node or UE, in response to the sent or transmitted message or allocation data (the receiving node may be the allocation node or a different node).

The method may comprise a step of performing one or more subsequent resource management operations, e.g. by the receiving node or allocation node or a different node, in particular based on the received feedback (or, more general, based on received D2D data).

The first network node or allocation node may adapt the scheduling for transmitting the D2D-specific feedback by the UE (e.g. in the allocation data) to avoid collision with another transmission from the same UE, unless the UE supports simultaneous transmissions of the two transmission types.

Independent UE (Approach 1 and/or 2)

A method in or performed by a D2D enabled node or UE comprising the steps of:

1) Step 1: receiving allocation data, e.g. a D2D resource grant or D2D resource release message, from a network node, in particular an allocation node;

2) Step 2: sending or transmitting to a receiving node, e.g. the network node, an indication indicative of successful/unsuccessful reception of the D2D resource grant or D2D resource release message, e.g. an A/N feedback and/or corresponding D2D data.

The indication may comprise a D2D-specific feedback transmitted on an UL control channel to the network, in particular the network node or receiving node.

The indication may comprise an implicit indication, which may further comprise a mandatory D2D transmission in all or a subset of the resources granted by the D2D resource grant or allocation data (the transmission may be mandatory for the D2D enabled node and/or be according to the allocation data and/or resource grant).

The indication may comprise a D2D resource release indication, e.g. if the D2D enabled node doesn't need the resources.

The sending or transmitting may be performed in subframe n+M, wherein n is the time or subframe the grant is sent from network node to the UE, M is the time interval or subframe difference between resource grant receiving and indication transmission, and wherein M is pre-defined or configurable by the network node, in particular an allocation node.

The first D2D enabled node or UE may adapt the scheduling for transmitting the indication to avoid collision with another transmission from the UE, unless the UE supports simultaneous transmissions of the two transmissions.

LIST OF ACRONYMS

D2D device-to-device, device-to-device communication
OFDM Orthogonal Frequency-Division Multiplexing; a coding scheme for wireless communication which is widely used, e.g. in LTE
AP access point
UE user equipment
Ack signal to indicate acknowledgement
Nack signal to indicate non-acknowledgement
A/N Ack or Nack
eNB eNodeB; example for a base station according to LTE
3GPP $3^{rd}$ Generation Partnership Project
LTE Long Term Evolution
IP Internet Protocol
DCI Downlink Control Information; in particular as defined by LTE/E-UTRAN
UL Uplink; generally referring to transmission of data to a node/into a direction closer to a network core (physically and/or logically); in particular from a UE to a base station; in the context of D2D, it may refer to the spectrum/bandwidth utilized for transmitting in D2D, which may be the same used for UL communication to a eNB in cellular communication
DL Downlink; generally referring to transmission of data to a node/into a direction further away from network core (physically and/or logically); in particular from a base station to a UE; often uses specified spectrum/bandwidth different from UL (e.g. LTE)
RNTI Radio Network Temporary Identity; an identifier for devices in a wireless network
RAN/RAT Radio Access Network/Radio Access Technology
E-UTRA/N Evolved UMTS Terrestrial Radio Access/Network, an example of a RAT
SA Scheduling Assignment; a form a control data In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein.

A corresponding program code may be stored in an associated memory and/or storage medium and/or be hard-wired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE.

A communication may in particular comprise a physical layer (PHY) transmission and/or reception, onto which logical channels and/or logical transmission and/or receptions may be imprinted or layered. A node of a wireless communication network may be implemented as a user equipment and/or base station and/or relay node and/or any device generally adapted for device-to-device communication. A wireless communication network may comprise at least one of a device configured for device-to-device communication and/or a user equipment and/or base station and/or relay node, in particular at least one user equipment, which may be arranged for device-to-device communication with a second node of the wireless communication network, in particular with a second user equipment.

A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes.

A user equipment (UE) may generally be a device configured for wireless device-to-device communication and/or a terminal for a wireless and/or cellular network, in particular a mobile terminal, for example a mobile phone, smart phone, tablet, PDA, etc. A user equipment may be a node of or for a wireless communication network as described herein, in particular a D2D enabled node. It may be envisioned that a user equipment is adapted for one or more RATs, in particular LTE/E-UTRA. A user equipment may generally be proximity services (ProSe) enabled. It may be considered that a user equipment comprises radio circuitry and/or control circuitry for wireless communication.

Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment. It may be considered that a user equipment is configured to be a user equipment adapted for LTE/E-UTRAN.

A base station may be any kind of base station of a wireless and/or cellular network adapted to serve one or more user equipments. It may be considered that a base station is a node of a wireless communication network. A base station may be adapted to provide and/or define one or more cells of the network and/or to allocate frequency and/or time resources for communication to one or more nodes of a network, in particular UL resources, for example for device-to-device communication, which may be communication between devices different from the base station. Generally, any node adapted to provide such functionality may be considered a base station. It may be considered that a base station comprises radio circuitry and/control circuitry for wireless communication. It may be envisioned that a base station is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry.

A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station.

A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a coordinating node and/or to allocate resources in particular for device-to-device communication between two nodes of a wireless communication network, in particular two user equipments.

Device-to-device (D2D) communication may generally refer to communication between nodes of a wireless communication network, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments.

Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or coordinating node and/or with a base station or coordinating node providing merely auxiliary services, e.g. configuration data or a transmission configuration or related information for a message intended for device-to-device communication between user equipments. In the latter case, it may be considered that data and/or signals flowing between the nodes performing device-to-device communication are not transported via the base station and/or coordinating node. In contrast, during cellular communication, network layers above the eNB/base station/coordination node may generally be involved, in particular core layers which may be connected to the eNB/base station/coordinating node via cable/land line.

During device-to-device communication, a message may be provided and/or transmitted and/or received. A message may be considered to be or be represented by a batch of physical layer transmissions and/or may comprise such. A message may comprise information regarding the transmission configuration, in particular regarding related information, e.g. in a header, and/or a payload. A unidirectional message may be a message for connectionless communication and/or for which no prior communication and/or prior connection between the transmitting node and receiving node is necessary and/or available and/or for which no response or no response protocol or no handshake is expected. A device configured for device-to-device communication, which may be called D2D enabled device or node, may comprise control circuitry and/or radio circuitry configured to provide device-to-device communication, in particular configured to enable proximity services (ProSe-enabled), e.g., according to LTE/E-UTRA requirements.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

There are generally disclosed:

A method for monitoring D2D communication, in particular in a wireless communication network, comprising:

receiving, by a first D2D enabled node of the wireless communication network, of allocation data indicating allocated resources (which may be transmitted by an allocation node of the wireless communication network), for the first D2D enabled node, for example for D2D communication with a second D2D enabled node of the wireless communication network; and transmitting, by the first D2D enabled node of the wireless communication network, D2D data utilizing and/or on the indicated allocated resources; and receiving, by a receiving node of the wireless communication network, of the D2D data transmitted by the first D2D enabled node. Accordingly, the receiving node may be informed about the resources used based on the received D2D data.

There is also disclosed a method for operating a first D2D enabled node in a wireless communication network, comprising: receiving, by the first D2D enabled node and/or a receiving module of the first D2D enabled node, of allocation data indicating allocated resources for the D2D enabled node for D2D communication with a second D2D enabled node of the wireless communication network; and transmitting, by the first D2D enabled node and/or a transmitting module of the first D2D enabled node, D2D data on and/or utilizing the allocated resources. Based on the D2D data and/or the resources used for transmitting, monitoring of utilized resources is possible, e.g. for a receiving node.

There is also disclosed a method for operating a node, in particular a receiving node, in a wireless communication network, comprising: receiving, by the node and/or a date receiving module of the node, of D2D data on and/or utilizing allocated resources, the allocated resources being allocated to and/or for a first D2D enabled node of the wireless communication network, for example for D2D communication with a second D2D enabled node of the wireless communication network. The node may be different from the second D2D enabled node and/or the first D2D enabled node. The node may be a receiving node and/or a base station, in particular an allocation node. The D2D data may be transmitted by and/or received from the first D2D enabled node, which may be adapted to transmit D2D data in response to and/or after it received allocation data. The (receiving) node may determine utilization of resources based on the D2D data.

There is also disclosed a first D2D enabled node for and/or of a wireless communication network, the first D2D enabled node being adapted to receive allocation data, for example by a receiving module of the node. The first D2D enabled node may be adapted to transmit, e.g. by a transmission module of the node, D2D data, in particular on resources allocated to the node according to the allocation data and/or based on allocation data. The D2D data may comprise an acknowledgment or non-acknowledgement signal or message or A/N feedback, which may be determined by an acknowledgement module of the first D2D enabled node. The first D2D enabled node may be adapted to carry out any one or more than one corresponding steps or parts of methods or methods as outlined herein.

There is also disclosed a receiving node for and/or of a wireless communication network. The receiving node may be adapted to receive D2D data transmitted by a first D2D enabled node of the wireless communication network. The D2D data may be transmitted to and/or for a second D2D enabled device. It may be considered that the receiving node is adapted to determine usage of the allocated resources by the first D2D enabled node based on the received D2D data. For such determination reception of no D2D data may generally be considered to indicate that the allocated resources are not used. The receiving node may be an allocation node and/or comprise corresponding features and/ or be adapted to carry out any one or more than one corresponding steps or parts of methods or methods as outlined herein. An allocation node may be adapted to control D2D communication based on the received D2D data, in particular if the receiving node is an allocation node.

There is also disclosed a wireless communication network comprising at least a receiving node and a first D2D enabled node and/or the nodes according to any one of the methods described herein and/or adapted to perform any one of the methods described herein.

The receiving node may generally be a base station and/or the allocation node and/or comprise base station functionality. It may be envisaged that in one alternative, the receiving node is able to communicate with the allocation node and/or is adapted to provide information regarding the D2D data and/or D2D data received to the allocation node. The receiving node may be an allocation node, in particular a base station, and/or be adapted to transmit the allocation data to the first D2D node.

In one alternative, the receiving node may be different from the allocation node. Alternatively, the receiving node may be the allocation node. Generally, the receiving node may be different from the second D2D enabled node.

Generally, there is also disclosed a computer program product comprising instructions executable by control circuitry and/or a computing device, the instruction causing the control circuitry and/or computing device to carry out and/or control any one of the methods described herein when executed by the control circuitry and/or computing device. The control circuitry and/or computing device may be implemented in any one or more than one of the nodes to carry out and/or control corresponding methods or method steps.

Generally, receiving of D2D data may comprise listening to and/or monitoring D2D data transmission.

An allocation node may be a node or base station adapted to allocate resources, in particular allocate D2D resources and/or UL resources and/or allocate resources for D2D communication, in particular for communication between a first D2D enabled node and a second D2D enabled node, and/or allocate resources to a first D2D enabled node and/or a second D2D enabled node, in particular for D2D communication.

Allocation data may be considered to be data indicating resources allocated by the allocation node, in particular data identifying or indicating which resources are reserved or allocated for D2D communication for a D2D enabled node and/or which resources a D2D enabled node may use for D2D communication and/or data indicating a resource grant or release. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE. In particular, allocation data may comprise information and/or instructions to reserve resources or to release resources, which may already be allocated. Generally, allocation data may indicate and/or instruct transmission mode and/or configuration, in particular regarding a power level of transmission, e.g. for the first D2D enabled node. The first D2D enabled node may generally be adapted to perform transmission configuration according to allocation data, in particular to set a corresponding power level.

D2D data may be data transmitted in the context of and/or for and/or in and/or during D2D communication, in particular to and/or for a second D2D enabled node and/or a receiving node; this may mean that the D2D data is intended and/or addressed and/or encoded for the corresponding node. Generally, D2D data may comprise data and/or one or more messages or data packets transmitted on and/or utilizing resources allocated for the D2D communication, which may be indicated in the allocation data, which may be transmitted by and/or received from an allocation node. D2D data may comprise an Acknowledgement and/or Non-Acknowledgement message, in particular in response to allocation data received.

It may be envisioned that D2D data is addressed to a specific D2D enabled node, in particular a second D2D enabled node. The D2D data may comprise corresponding header information. D2D data may be encoded or encodable by the first D2D enabled node. It may be considered that D2D data is decodable at least in part by the receiving node. Alternatively, the D2D data may be encoded in a manner that the receiving node is only able to determine its presence or absence, but not to decode it. D2D data may be transmitted to and/or for a second DVD enabled node and/or at least partly for and/or to a receiving node, e.g. as an A/N feedback.

Allocation data and/or D2D data generally may be transmitted in the form of corresponding messages and/or signals and/or packets and/or channels, such that for example a D2D signal may represent D2D data.

Allocated resources may generally be frequency and/or time resources. Allocated resources may comprise frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first D2D enabled node to transmit to and/or for a second D2D enabled node. Transmitting on allocated resources or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. An allocation node may be adapted to transmit corresponding allocation data indicating release or de-allocation of resources to one or more D2D enabled nodes, in particular to a first D2D enabled node.

A D2D enabled node may generally be a node adapted to perform D2D communication, in particular a terminal and/or user equipment. The D2D enabled node may be adapted to transmit D2D data based on allocation data, in particular on and/or utilizing resources indicate in the allocation data. In this context, stopping D2D communication in response and/or based on a release message may be considered to correspond to transmitting based on allocation data, wherein the release message may be considered to be allocation data.

Modules performing method steps described herein may generally be implemented in software and/or hardware and/or firmware in and/or on corresponding nodes. Modules of or on or in one node may be implemented in a common module or flow and/or in parallel and/or independent modules or flows.

Figure 3:
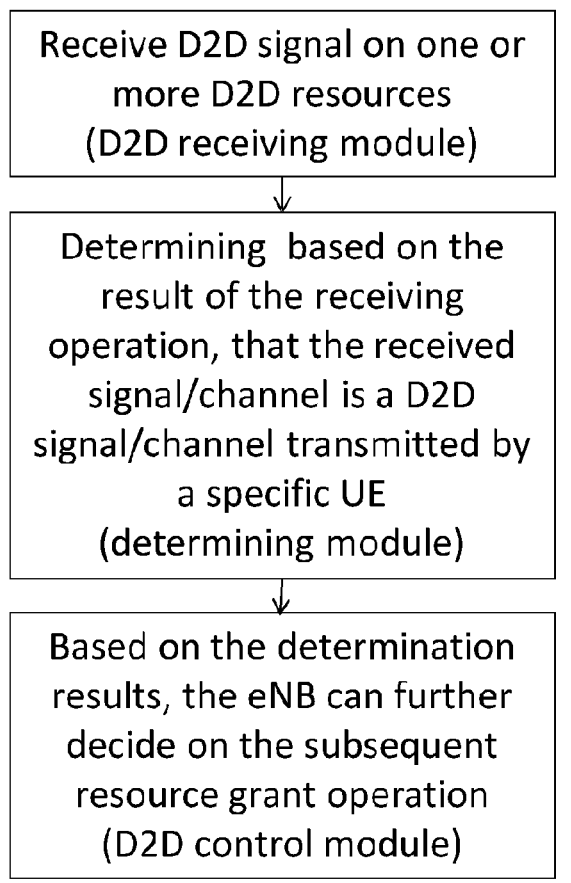
FIG. 3 a diagram of a method performed in an eNB.

FIG. 3 shows a flow diagram of a variant performed in an eNB, which may generally perform the functions of a receiving node and an allocation node as described herein.

The eNB may receive a D2D signal and/or D2D data on one or more D2D resources. This may be performed by a D2D receiving module. The resources may be determined based on allocation data received, in particular from an allocation node and/or chosen from allocation data. The allocation data may represent a resource grant.

The eNB may determine, based on the result of the receiving operation, that the received signal/channel is a D2D signal/channel/data transmitted by a specific UE. This may be performed by a determining module.

Based on the determination results, the eNB may further decide on the subsequent resource grant operation, which may be performed by a D2D control module. The resource grant operation may include allocating resources and/or releasing resources and/or transmitting corresponding allocation data.

Figure 4:
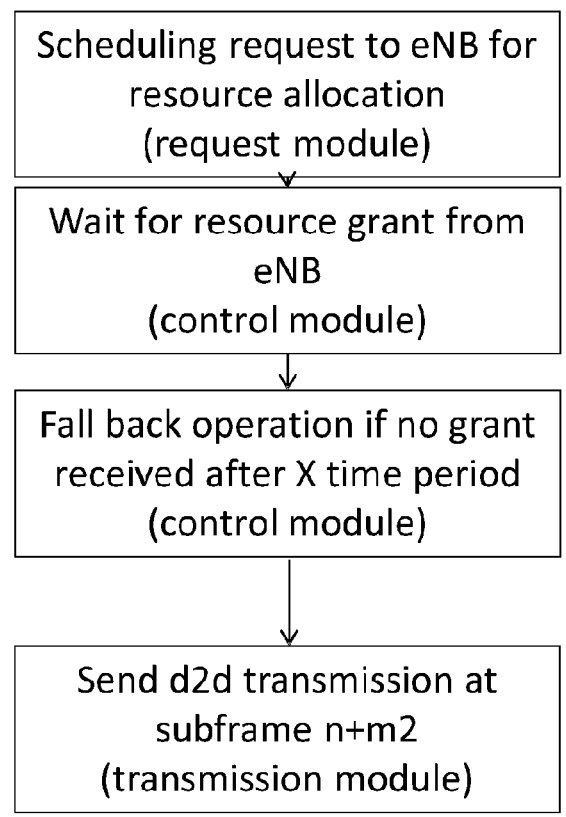
FIG. 4 a diagram of a method performed by a UE.

FIG. 4 shows a diagram of a method performed by an UE, representing a first D2D enabled node. The UE may perform scheduling a request to eNB for resource allocation, which may be performed by a request module. Accordingly, a corresponding request may be sent or transmitted to the eNB, which may be an eNB as described herein, in particular in relation to FIG. 3. The UE may wait for resource grant from eNB and/or for corresponding allocation data. If no such data or grant is received after a pre-determined time period X, a fall back operation may be controlled. This may be performed by a control module. The fallback may include transmitting or sending a D2D transmission or D2D data at a subframe n+m2 (as discussed above in the context of m1 and m2). This may be performed by a transmission module.

Figure 5:
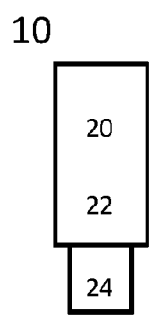
FIG. 5 an exemplary D2D enabled node or user equipment.

FIG. 5 schematically shows a D2D enabled node or user equipment 10, which may be a node of a device-to-device communication, in closer details. User equipment 10 comprises control circuitry 20, which may comprise a controller connected to a memory. A receiving module and/or transmission module and/or control module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein and/or receiving allocation data and/or transmit D2D data based on allocation data.

Figure 6:
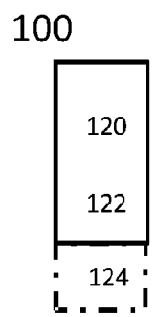
FIG. 6 an exemplary base station.

FIG. 6 schematically show a base station 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to provide good signal reception or transmittance and/or amplification.

Generally, there may be considered a method for monitoring D2D communication, in particular in a wireless communication network, comprising receiving of allocation data indicating allocated resources transmitted for a first D2D enabled node for D2D communication with a second D2D enabled node of the wireless communication network; and transmitting D2D data utilizing and/or on the indicated allocated resources; and receiving of the D2D data transmitted by the first D2D enabled node.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for monitoring Device-to-Device (D2D) communication, the method comprising:
   transmitting, by a transmitter of a receiving node of a wireless communication network, first allocation data indicating allocated resources for a first D2D enabled node;
   receiving, by a receiver of the first D2D enabled node, the first allocation data indicating the allocated resources for the first D2D enabled node;
   transmitting, by a transmitter of the first D2D enabled node, D2D data utilizing and/or on the allocated resources indicated by the first allocation data;
   receiving, by the receiving node of the wireless communication network, D2D data transmissions utilizing and/or on the allocated resources indicated by the first allocation data;

determining, by a processor of the receiving node of the wireless communication network, whether a D2D specific feedback is received at a pre-defined time-frequency resource from the first D2D enabled node;

based on a result of determining whether the D2D specific feedback is received at the pre-defined time-frequency resource from the first D2D enabled node, determining, by the processor of the receiving node of the wireless communication network, usage of the allocated resources by the first D2D enabled node;

based on a result of determining the usage of the allocated resources, transmitting, by the transmitter of the receiving node of the wireless communication network, second allocation data indicating allocated resources for the first D2D enabled node;

receiving, by the receiver of the first D2D enabled node, the second allocation data indicating the allocated resources for the first D2D enabled node; and transmitting, by the transmitter of the first D2D enabled node, D2D data utilizing and/or on the allocated resources indicated by the second allocation data.

2. A method for operating a first Device-to-Device (D2D) enabled node in a wireless communication network, the method comprising:

receiving, by a receiver of the first D2D enabled node, first allocation data indicating allocated resources for the first D2D enabled node for D2D communication with a second D2D enabled node of the wireless communication network, wherein the first allocation data further indicates that a transmit power of D2D transmissions by the first D2D enabled node should be greater than or equal to a threshold compared to a transmit power of a cellular transmission by the first D2D enabled node;

transmitting, by a transmitter of the first D2D enabled node, D2D data on and/or utilizing the allocated resources indicated by the first allocation data;

in response to transmitting the D2D data on and/or utilizing the allocated resources indicated by the first allocation data, receiving, at the receiver of the first D2D enabled node, second allocation data indicating allocated resources for the first D2D enabled node based on usage of the allocated resources indicated by the first allocation data; and transmitting, by the transmitter of the first D2D enabled node, D2D data on and/or utilizing the allocated resources indicated by the second allocation data.

3. A method for operating a node in a wireless communication network, the method comprising:

transmitting, by a transmitter of the node, first allocation data indicating allocated resources for a first Device-to-Device (D2D) enabled node;

receiving, by the node of the wireless communication network, D2D data transmissions on and/or utilizing the allocated resources indicated by the first allocation data, the allocated resources being allocated to and/or for the first D2D enabled node of the wireless communication network;

determining, by a processor of the node of the wireless communication network, whether a D2D specific feedback is received at a pre-defined time-frequency resource from the first D2D enabled node;

based on a result of determining whether the D2D specific feedback is received at the pre-defined time-frequency resource from the first D2D enabled node, determining, by the processor of the node of the wireless communication network, usage of the allocated resources by the first D2D enabled node; and based on a result of determining the usage of the allocated resources, transmitting, by the transmitter of the node of the wireless communication network, second allocation data indicating allocated resources for the first D2D enabled node.

4. The method of claim 3, further comprising:

in response to determining, based on the received D2D data, that the allocated resources indicated by the first allocation data are not used by the first D2D enabled node, transmitting second allocation data indicating resource release.

5. The method of claim 3, further comprising:

in response to determining, based on the received D2D data, that the allocated resources indicated by the first allocation data are not used by the first D2D enabled node, transmitting second allocation data indicating resource grant.

6. A first Device-to-Device (D2D) enabled node for a wireless communication network, the first D2D enabled node comprising:

a receiver configured to:
receive first allocation data indicating allocated resources for the first D2D enabled node, wherein the first allocation data further indicates that a transmit power of D2D transmissions by the first D2D enabled node should be greater than or equal to a threshold compared to a transmit power of a cellular transmission by the first D2D enabled node, and receive second allocation data indicating allocated resources for the first D2D enabled node based on usage of the allocated resources indicated by the first allocation data, and a transmitter configured to:
transmit D2D data on and/or utilizing the allocated resources indicated by the first allocation data, and transmit D2D data on and/or utilizing the allocated resources indicated by the second allocation data, wherein the D2D data comprises an acknowledgment or a non-acknowledgment (A/N) signal or a message or an A/N feedback.

7. A receiving node for a wireless communication network, the receiving node comprising:

a transmitter configured to:
transmit first allocation data indicating allocated resources for a first Device-to-Device (D2D) enabled node, and transmit second allocation data indicating allocated resources for the first D2D enabled node;

a receiver configured to:
receive D2D data on and/or utilizing the allocated resources indicated by the first allocation data; and a processor configured to:
determine, whether a D2D specific feedback is received at a pre-defined time-frequency resource from the first D2D enabled node;

based on a result of the determination that whether the D2D specific feedback is received at the pre-defined time-frequency resource from the first D2D enabled node, determine usage of the allocated resources by the first D2D enabled node, wherein the transmitter is configured to transmit the second allocation data based on a result of the determined usage of the allocated resources by the first D2D enabled node.

* * * * *